May 22, 1934.   J. G. PAULIN   1,959,544
DAMPING DEVICE FOR MEASURING INSTRUMENTS
Filed May 28, 1930

Patented May 22, 1934

1,959,544

UNITED STATES PATENT OFFICE 1,959,544

DAMPING DEVICE FOR MEASURING INSTRUMENTS

Josua Gabriel Paulin, Eskilstuna, Sweden

Application May 28, 1930, Serial No. 456,455
In Sweden October 31, 1929

3 Claims. (Cl. 188—96)

The present invention refers to aircraft measuring instruments where the movable system is very sensitively suspended and where, in order to get a rapid reading, means are provided for damping the oscillations of the system. For this purpose liquid dampers have often been used comprising a tubular container wholly or partly filled with a suitable liquid and a movable damper wing attached to the movable system. In instruments which are exposed to severe vibrations and blows, it is very important to provide an effective and reliable liquid damping. It has hitherto been a difficulty that the liquid sometimes is thrown out of the damping container, which at its one end must be open to render possible the assembly of the parts on the removal of the damper wing from the container respectively. One has tried to overcome this difficulty by using a thick oil but such oils will be too thick already at temperatures of $-5°$ – $-10°$ centigrade. An aircraft instrument, however, is often subjected to very low temperatures and a liquid or emulsion of liquids which is freezing at a low temperature, for instance, at $-50°$ or $-60°$ centigrade must be chosen which, however, will be so diluted at ordinary temperature that sufficient damping effect will not be obtained unless the damper wing and the tubular container have a comparatively great area. The capillary action, however, will then be too small to keep the liquid in the damping container.

According to the present invention these drawbacks are avoided in a simple and effective way. The opening of the tubular damping container, preferably made of glass, is covered by a cap or the like provided with an opening for the arm carrying the damper wing, and moistened on its inside by the damping liquid so that the liquid is kept inside the damping container by the capillary forces.

Figure 1:
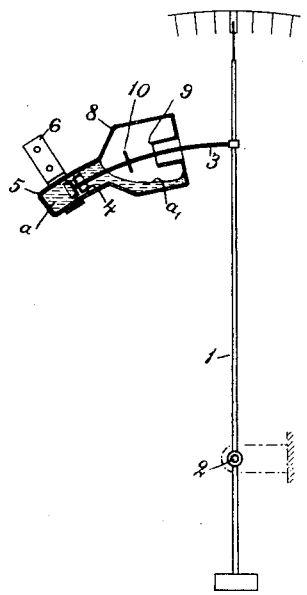
Figure 2:
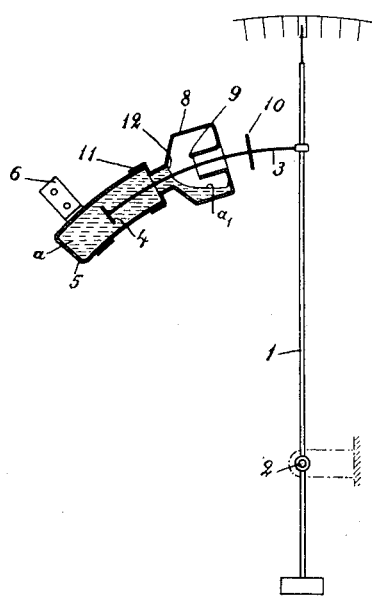

The invention will be described more closely with reference to the accompanying drawing. Figures 1 and 2 show two different embodiments of the invention adapted for the same purpose.

The readily movable system of the instrument is in both figures represented by a pointer 1 balanced by means of a counterweight and pivoted at 2 and provided with a projecting arm 3, to form an arc having its centre coinciding with the pivot of the pointer and carrying the damper wing 4. The latter is movable in a tubular container 5 filled with damping liquid and of an arcuate shape conforming with the arm 3. The tube 5 is attached to the frame of the instrument by means of a lug 6. The diameter of the damper wing 4 is somewhat smaller than the inner diameter of the tube so that an annular gap or clearance is formed between the damper-wing and the inside of the tube corresponding to the desired damping effect. The tube 5 is preferably made of glass in order to facilitate the adjustment and the centering of the damper wing.

In the embodiment shown by Figure 1 the container 5 is provided with a flared extension forming a wider outer vessel 8 communicating with a container through the mouth of the latter. The outer end of the vessel 8 is provided with an opening for the arm 3. This opening is formed like a tubular flange 9 turned inwards. Also the vessel 8 may be made of glass and in one piece with the tube 5. The damping liquid $a$ fills up the damper to such an extent as to reach the zone of increasing diameter between the container and the vessel and thereby to form a thin layer $a'$ on the bottom of the vessel. It may be seen from the figure that the liquid cannot run away even if the container is turned in any possible direction. Only during transport of the instrument by railway, etc. it is likely that some liquid may sprinkle out through the opening 9. To prevent this there is a small plate 10 attached to the arm 3 and adapted to cover the opening 9 if the pointer of the instrument is arrested during the transport.

In the embodiment according to Figure 2, the container containing the damping liquid as in Figure 1 consists of a tube 5 with uniform diameter. The mouth of the tube is however covered by a cap 11 fitting closely on the tube and provided with a little opening 12 of sufficient diameter to allow an easy passage of the thin arm 3.

If the instrument is exposed to great variations of temperature, the arrangement shown in Figure 2 has proved to be more reliable.

The cap 11 is detachably mounted on tube 5 and is provided with an extension forming a wider outer vessel 8 which communicates with the container 5 through the aperture 12. Around said aperture said extension is formed with a reduced portion or a contraction of the wall, said reduced portion having a smaller diameter than the container 5. When the apparatus is put together, the arm is put through the opening 12 before the wing 4 is fastened to the arm 3. Finally the tube 5 is filled with liquid and is fastened to the cap 11. If the temperature is rising so that the volume of the liquid should increase more than that of the tube 5, the surplus will not run away but join with the surplus which is filled into the vessel 8 when putting the instrument together.

I claim:

1. In an aircraft measuring instrument having a sensitively suspended movable system, a damping device for said movable system comprising in combination, a tubular liquid-container, a damper wing movable in said container, an arm extending through the mouth of the container for connecting said damper wing with the movable system of the instrument, a detachable cover provided with an aperture, and disposed on the mouth of the container, said cover being provided with an extension forming an outer vessel communicating with the container through said aperture and having a larger diameter than the container and the quantity of damping liquid in the container being so chosen as to reach the zone of increase of diameter between the container and the vessel.

2. A damping device as claimed in claim 1, in which the connecting-arm aperture is provided with an inwardly turned edge forming a tubular flange projecting into the vessel.

3. In an aircraft measuring instrument having a sensitively suspended movable system, a damping device for said movable system comprising in combination, a tubular liquid-container, a damper wing movable in said container, an arm extending through the mouth of the container for connecting said damper wing with the movable system of the instrument, said container being provided with an extension forming an outer vessel wider than the container and communicating therewith, said vessel being provided at its inner end with a reduced portion having a smaller diameter than the container and at its outer end with an aperture for the connecting arm, an inwardly turning edge formed around said aperture, and the quantity of damping liquid in the container being so chosen as to reach the zone of increase of diameter between the container and the vessel.

JOSUA GABRIEL PAULIN.